(12) United States Patent
Ory et al.

(10) Patent No.: US 8,602,446 B2
(45) Date of Patent: Dec. 10, 2013

(54) INFLATABLE AIRBAG FLAP ARTICULATED TO AN INSTRUMENT PANEL BY A TETHER DESIGNED TO RELEASE AN ADDITIONAL LENGTH OF TETHER WHEN THIS FLAP OPENS

(75) Inventors: Daniel Ory, Le Plessis-Bouchard (FR); Thierry Schupbach, Saint Crepin Ibouvilliers (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/636,680

(22) PCT Filed: Mar. 23, 2011

(86) PCT No.: PCT/EP2011/001442
§ 371 (c)(1),
(2), (4) Date: Nov. 30, 2012

(87) PCT Pub. No.: WO2011/116948
PCT Pub. Date: Sep. 29, 2011

(65) Prior Publication Data
US 2013/0193674 A1 Aug. 1, 2013

(30) Foreign Application Priority Data
Mar. 24, 2010 (FR) ...................... 10 52135

(51) Int. Cl.
*B60R 21/215* (2011.01)
(52) U.S. Cl.
USPC ..................................... 280/728.3

(58) Field of Classification Search
USPC ...................................... 280/728.3
See application file for complete search history.

(56) References Cited

U.S. PATENT DOCUMENTS

| 5,372,379 | A | * | 12/1994 | Parker | 280/728.3 |
| 5,378,013 | A | * | 1/1995 | Warner | 280/728.3 |
| 5,458,365 | A | * | 10/1995 | Rogers et al. | 280/728.3 |
| 5,460,401 | A | * | 10/1995 | Gans et al. | 280/728.3 |

(Continued)

FOREIGN PATENT DOCUMENTS

| EP | 0872388 | 10/1998 |
| FR | 2929569 | 10/2009 |
| JP | 7156738 | 6/1995 |
| JP | 8192706 | 7/1996 |

OTHER PUBLICATIONS

International Search Report for PCT/EP2011/001442 dated Jun. 17, 2011, 3 pages (translated).

*Primary Examiner* — Nicole Verley
(74) *Attorney, Agent, or Firm* — Reising Ethington P.C.

(57) ABSTRACT

The invention relates to a vehicle instrument panel inflatable airbag arrangement (11), comprising a flap covering an airbag module, a tether (18) secured to the flap and to fixed means (16) rigidly secured to the instrument panel to constitute an articulation of the flap with respect to the instrument panel. According to the invention, a portion (21) of the flexible tether (18) passes around a limit stop (19) that forms part of the fixed means (16) while being fixed to these fixed means (16) a certain distance away from this limit stop (19) so that when the flap opens, the linear tether (18) is torn out of the fixed means (16) in order to come to press against the limit stop (19) in order to release an additional length of tether making it possible to increase the mobility of the flap.

6 Claims, 2 Drawing Sheets

(56) References Cited

U.S. PATENT DOCUMENTS

| | | | |
|---|---|---|---|
| 5,472,228 A * | 12/1995 | Bentley et al. | 280/728.3 |
| 5,474,324 A * | 12/1995 | Bentley et al. | 280/728.3 |
| 5,496,060 A * | 3/1996 | Whited et al. | 280/728.3 |
| 5,533,746 A * | 7/1996 | Whited | 280/728.2 |
| 5,613,701 A * | 3/1997 | Bentley et al. | 280/728.3 |
| 5,651,562 A * | 7/1997 | Hagen et al. | 280/728.3 |
| 5,653,461 A * | 8/1997 | Fischer | 280/728.3 |
| 6,053,527 A * | 4/2000 | Gans et al. | 280/728.3 |
| 6,082,760 A * | 7/2000 | Ukai et al. | 280/728.3 |
| 6,196,574 B1 * | 3/2001 | Stavermann | 280/728.3 |
| 6,203,056 B1 * | 3/2001 | Labrie et al. | 280/728.3 |
| 6,283,498 B1 * | 9/2001 | Breitweg | 280/728.3 |
| 6,431,585 B1 * | 8/2002 | Rickabus et al. | 280/728.3 |
| 6,746,045 B2 * | 6/2004 | Short et al. | 280/736 |
| 6,955,376 B1 * | 10/2005 | Labrie et al. | 280/728.3 |
| 7,104,566 B2 * | 9/2006 | Pinsenschaum et al. | 280/728.3 |
| 7,216,892 B2 * | 5/2007 | Baumbach et al. | 280/728.2 |
| 7,698,788 B2 * | 4/2010 | Hansen et al. | 24/297 |
| 7,874,578 B2 * | 1/2011 | Thomas et al. | 280/728.3 |
| 8,177,255 B2 * | 5/2012 | Le Hoang et al. | 280/728.3 |
| 8,297,676 B2 * | 10/2012 | Osterhout et al. | 296/1.08 |
| 8,439,393 B2 * | 5/2013 | Glaser | 280/728.2 |
| 2004/0004343 A1 | 1/2004 | Pinsenschaum | |
| 2006/0131843 A1 * | 6/2006 | Sherwood et al. | 280/728.3 |
| 2006/0220356 A1 * | 10/2006 | Baekelandt | 280/730.2 |

\* cited by examiner

INFLATABLE AIRBAG FLAP ARTICULATED TO AN INSTRUMENT PANEL BY A TETHER DESIGNED TO RELEASE AN ADDITIONAL LENGTH OF TETHER WHEN THIS FLAP OPENS

The invention relates to an inflatable airbag arrangement with which a motor vehicle instrument panel is equipped by being positioned, for example, in such a way as to protect the passenger seated beside the driver of this vehicle.

BACKGROUND OF THE INVENTION

Such an arrangement comprises a flap that forms an integral part of the instrument panel, having its outline delimited by a precut line made on the underside face of the instrument panel, so that this flap is not visible to an occupant of the vehicle.

An inflatable airbag module is fixed to the underside face of the instrument panel, in the region of the flap, so that when airbag inflation is triggered, this airbag applies pressure to the underside face of the flap to cause this flap to open by breakage along the precut line. Opening then allows the airbag to deploy into the passenger compartment of the vehicle in order to protect the corresponding occupant.

Such a flap typically has a rectangular outline and is articulated with respect to the rest of the body of the instrument panel at the front transverse edge of its outline, namely the edge closest to the windshield of the vehicle.

In a solution known from document U.S. Pat. No. 5,653,46 and depicted in FIG. 1, the flap, with the general reference 1 is articulated to an instrument panel 2 by means of two tethers referenced 3.

Each tether has an upper end rigidly secured to the underside face of the flap, near the front edge of this flap with respect to the direction of forward travel A of the vehicle, and a lower end which is secured to the instrument panel 2, so that it can slide in relation thereto.

For this purpose, and as can be seen in FIG. 1, each tether 3 is passed through a corresponding tab 4 fixed to the front edge of the opening 6 of the instrument panel which accepts the flap 1. Each tether 3 has the overall form of a band or strap with a lower termination 7 that is wider than the opening delimited by each tab 4, thus forming a stop immobilizing the tether when its termination 7 reaches the tab.

In practice, when airbag inflation is triggered, this causes the opening of the flap which occurs in the form of a combined movement in which the flap lifts in relation to the instrument panel and rotates about the front edge of this flap.

The lifting of the flap in relation to the rest of the instrument panel is made possible by the sliding of the tethers 3 in the tabs 4 in an approximately vertical direction until the terminations 7 of the tethers come into abutment against these tabs 4.

In practice, it is necessary for the flap to be able to lift in relation to the rest of the instrument panel so that it can open with the suitable dynamics, notably without the risk of jamming. However, the setup with sliding tethers as illustrated in FIG. 1 is ill-suited to industrial-scale production as it is too expensive to implement in relation to the prices commanded.

In particular, bearing in mind the significant forces involved when the flap opens, there remains a significant risk that the terminations of the tethers will, nonetheless, pass through the tabs, this resulting in the flap being thrown out into the passenger compartment of the vehicle thereby potentially injuring an occupant.

OBJECT OF THE INVENTION

The object of the invention is to propose a solution to remedy the abovementioned disadvantages.

SUMMARY OF THE INVENTION

To this end, the subject of the invention is a vehicle instrument panel inflatable airbag arrangement, comprising a flap covering an airbag module, a tether secured to the flap and to fixed means rigidly secured to the instrument panel to constitute an articulation of the flap with respect to the instrument panel, characterized in that the tether is flexible and in that a portion of said tether passes around a limit stop borne by the fixed means or by the flap while being fixed to the fixed means or to the flap a certain distance away from this limit stop so that when the flap opens, the linear tether is torn out of the fixed means or of the flap over a predetermined length in order to come to press against the limit stop in order to release an additional length of tether making it possible to increase the mobility of the flap.

With this solution, a predetermined length of tether is instantly released as the flap opens, to allow the flap to lift while at the same time dependably keeping the flap secured to the instrument panel thanks to the fact that the tether passes around a fixed limit stop.

The invention also relates to an arrangement as defined hereinabove, in which the portion of tether passing around the limit stop is fixed to the fixed means or to the flap by nestling in retaining means which are spaced away from the limit stop.

The invention also relates to an arrangement as defined hereinabove, in which the retaining means comprise a lug situated between the portion of tether that they retain and the limit stop, each lug being frangible so that it breaks when the flap opens in order to release the portion of tether so that it can come to press against the limit stop.

The invention also relates to an arrangement as defined hereinabove, in which the tether is a tether of linear type and in which the retaining means form a groove.

The invention also relates to an arrangement as defined hereinabove, in which the limit stop forms an integral part of a firing canal fixed on the underside face of the instrument panel around the flap, and in which the portion of tether passing around the limit stop is fixed to the firing canal.

The invention also relates to an arrangement as defined hereinabove, in which the tether is a cable of round cross section made of synthetic fibers.

DETAILED DESCRIPTION OF THE INVENTION

The invention is based on the search for a solution in which the tether passes around a limit stop in order to constitute a dependable attachment that does not carry the risk of yielding under the effect of the forces developed by the assembly when airbag inflation is triggered.

Figure 2:
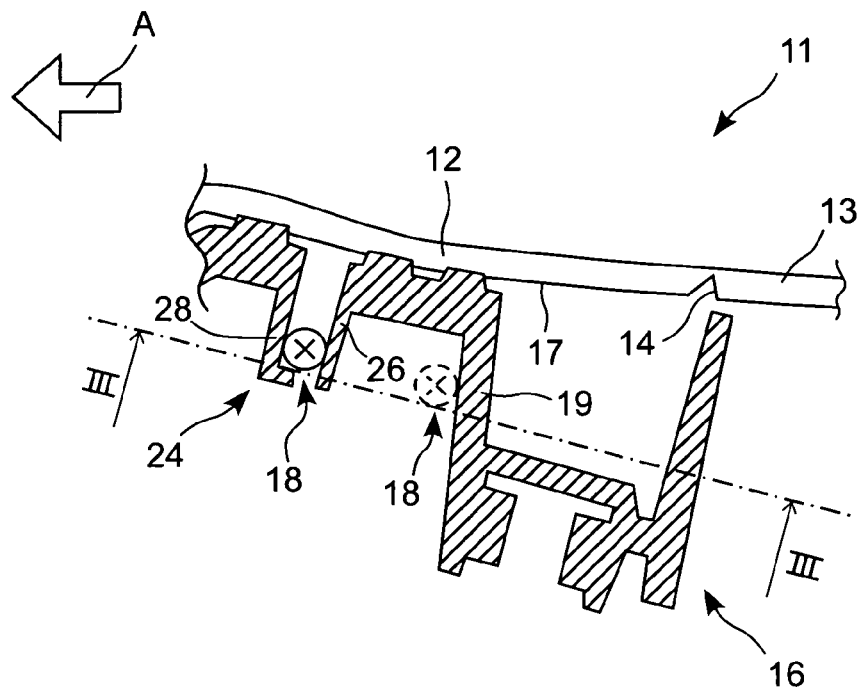
FIG. 2 is a schematic depiction of the arrangement according to the invention, viewed in a vertical plane of section oriented in the direction of forward travel of the vehicle.
Figure 3:
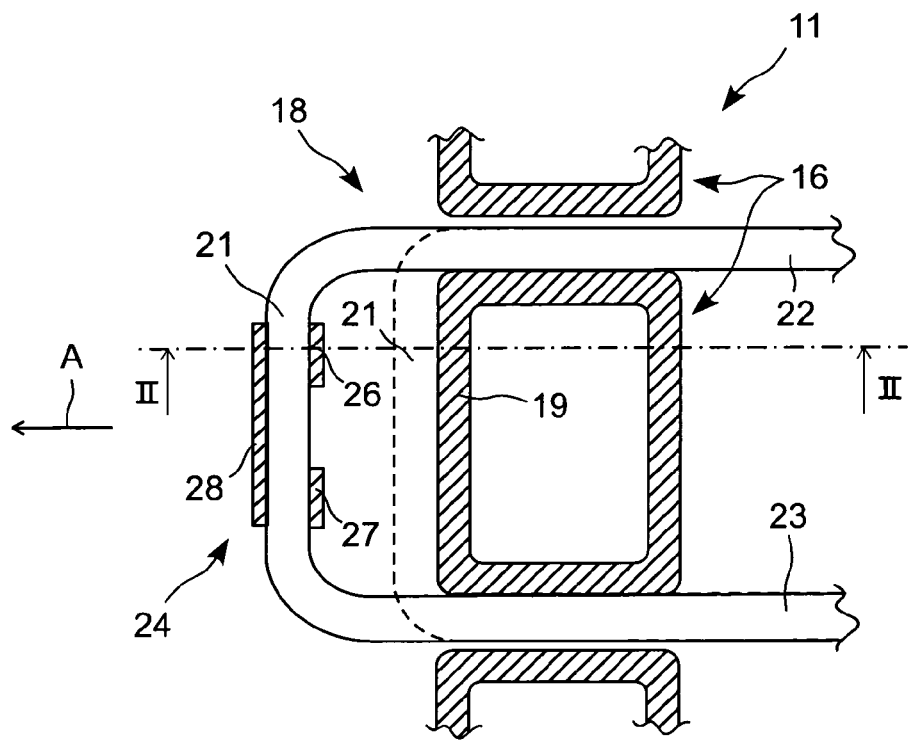
FIG. 3 is a schematic depiction showing the arrangement according to the invention in a vertical plane of section oriented parallel to the flap.

As may be seen in FIGS. 2 and 3, in which the invention bears the overall reference 11, an instrument panel 12 comprises a flap 13 delimited by a precut line made on the underside face of this instrument panel, this flap having only its front part visible in FIG. 2.

This precut line, which is generally of rectangular shape to delimit the outline of the flap, notably defines its front edge, referenced 14 in FIG. 2, which extends horizontally and transversely with respect to the direction of forward travel A of the vehicle, this edge 14 thus extending in the direction normal to the plane of FIG. 2.

A firing canal generally referenced 16 is fixed to the underside face 17 of the body of the instrument panel, for example by ultrasound welding, at a position such that it surrounds the flap 13. This firing canal has the overall form of a conduit the upper end of which can form to the curvature of the instrument panel and the lower end of which on the other hand is flat to accept an airbag module, not depicted.

The figures show the front portion of this firing canal 16, namely the portion which runs alongside the front edge 14 of the flap 13, this front portion constituting fixed means rigidly secured to the instrument panel and to which is secured a tether 18 via which the flap 13 is attached to the instrument panel.

The front portion of the firing canal in the region of attachment of the tether 18 comprises a part in the form of a box section or the like, referenced 19 in FIGS. 2 and 3 and around which the tether 18 passes so as to constitute a limit stop against which this tether comes to press when the flap 13 opens.

This limit stop 19 in the figures has the overall shape of a box section, but numerous other shapes are also possible provided they constitute a protrusion projecting beyond the underside face 17 in the downward direction and suited to having a tether pass around them in order to retain it firmly at the time of opening.

The tether 18 is depicted in solid line in the rest situation corresponding to the scenario in which the flap has not been opened and in which this tether is fixed to the front portion of the firing canal 16, and is depicted in dotted line for the activated situation corresponding to the scenario in which the flap has been opened or is in the process of opening, and in which this tether 18 is detached from the firing canal and pressing against the limit stop 19.

This tether 18, which is of the linear type, comprises a central portion 21 which passes around the limit stop 19 and which is extended by two attachment portions or strands referenced 22 and 23 respectively, and visible only in part, and the extensions of which are rigidly fixed to the flap 13, for example in the region of the underside face of this flap.

The tether 18 is preferably flexible. As depicted by way of example in FIGS. 2 and 3, the tether 18 is embodied in the form of a round cable. This cable has a polyethylene or polyester core surrounded by a braided sheath. The use of a flexible tether makes fitting easier and proves inexpensive. However, above all, such a tether carries no risk of damaging the bag during inflation, whereas the use of a rigid component made of metal or a plastic requires precautions to be taken in order not to tear the bag.

In the state of rest, the central portion 21 of the tether 18 is fixed to the front portion of the firing canal 16 in a position in which it is spaced away from the limit stop 19 around which the tether 18 passes. This fixing is performed here by simply nestling the central portion 21 in retaining means 24 which here takes the form of a groove formed in the front portion of the firing canal 16, and which is therefore rigidly secured to the instrument panel.

In the example of the figures, the retaining means form a groove delimited on the one hand by two lugs 26 and 27 and on the other hand by a frontal wall 28 spaced away from these lugs by a distance corresponding to the diameter of the tether 21.

The two lugs 26 and 27 are spaced transversely apart while being situated between the tether portion 21 and the limit stop 19, and they are oriented to protrude downward from the arrangement, running parallel to the limit stop 19. The frontal wall extends transversely while being situated forward of the lugs 26 and 27, and like the lugs is oriented to protrude downward from the arrangement while being oriented parallel to the overall vertical direction of the limit stop 19.

Fixing the tether 18 to the front part of the firing canal 16 thus involves positioning it around the limit stop 19 and engaging the portion 21 of this tether between, on the one hand, the wall 28 and, on the other hand, the lugs 26 and 27 to cause it to nestle in the groove that these three elements jointly delimit.

Figure 1:
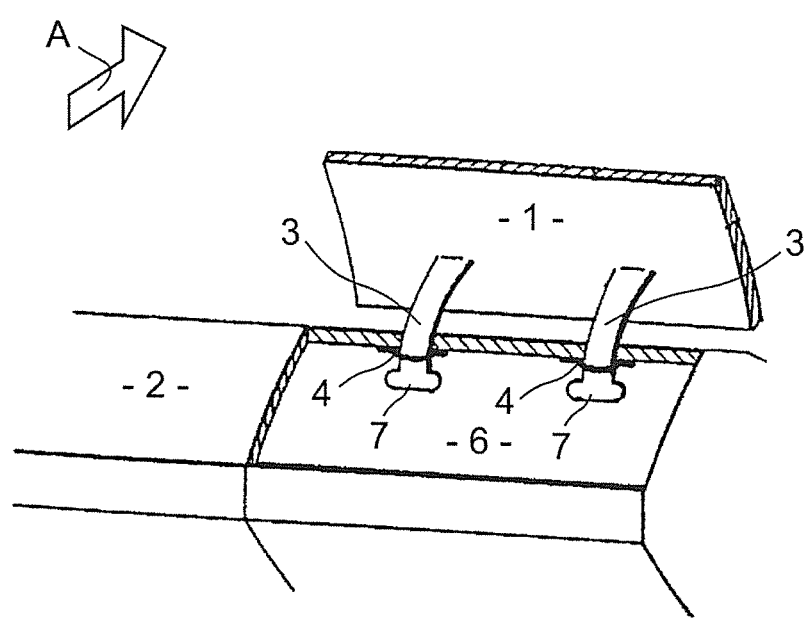
FIG. 1 is a perspective depiction of a known arrangement.

As will have been appreciated, the tether or tethers 18 replace the tethers 3 of the prior art depicted in FIG. 1. The tethers 18 therefore form a slack hinge allowing the flap 13 to lift, and then pivot when the portion 21 comes up against the limit stop.

In operation, when airbag inflation is triggered, this airbag comes to press on the underside face of the flap 13 and this has the effect of causing it to begin to open through breakage of the cut delimiting the outline of this flap. The flap therefore begins to open, which results in sudden tensioning of the portions 22 and 23 of the tether 18 which are rigidly secured to this flap, these portions therefore being pulled in the opposite direction to the direction of forward travel A of the vehicle.

This tension is therefore applied by the portion 21 of the tether 18 directly to the lugs 26 and 27 around which this tether passes. Given the high forces to which these lugs are therefore subjected, they break, releasing the tether 18 from the groove that they delimit, the central portion 21 therefore moving almost instantaneously in the opposite direction to the direction of forward travel A until it comes to press on the front face of the limit stop 19 which then definitively holds this tether firmly.

During this sequence, a predetermined additional length of tether is released, corresponding to the distance separating the tether retaining groove from the limit stop 19, thereby allowing the flap to lift so that it can open fully without the risk of this flap becoming disconnected.

In the example of the figures, the tether passes around a limit stop incorporated into the fixed means that the firing canal constitutes while being fixed to this firing canal. However, a symmetric setup is equally conceivable, namely a setup in which it is rather the limit stop which is borne by the flap, the tether then passing around this limit stop while being fixed to the flap a certain distance away from this limit stop.

The invention claimed is:

1. A vehicle instrument panel inflatable airbag arrangement, comprising a flap covering an airbag module, a tether secured to the flap and to fixed means rigidly secured to the instrument panel to constitute an articulation of the flap with respect to the instrument panel, characterized in that the tether is flexible and in that a portion of said tether passes around a limit stop borne by the fixed means or by the flap while being fixed to the fixed means or to the flap a certain distance away from this limit stop so that when the flap opens, the tether is torn out of the fixed means or of the flap over a predetermined length in order to come to press against the limit stop in order to release an additional length of tether making it possible to increase the mobility of the flap.

2. The arrangement as claimed in claim 1, in which the portion of tether passing around the limit stop is fixed to the fixed means or to the flap by nestling in retaining means which are spaced away from the limit stop.

3. The arrangement as claimed in claim 2, in which the retaining means comprise a lug situated between the portion of tether that they retain and the limit stop, each lug being frangible so that it breaks when the flap opens in order to release the portion of tether so that it can come to press against the limit stop.

4. The arrangement as claimed in claim 2, in which the tether is a tether of linear type and in which the retaining means form a groove.

5. The arrangement as claimed in claim 1, in which the limit stop forms an integral part of a firing canal fixed on the underside face of the instrument panel around the flap, and in which the portion of tether passing around the limit stop is fixed to the firing canal.

6. The arrangement as claimed in claim 1, in which the tether is a cable of round cross section made of synthetic fibers.

* * * * *